March 4, 1969     M. ALOSI     3,430,704
COMBINATION YARD AND GARDEN TOOL
Filed Aug. 24, 1966
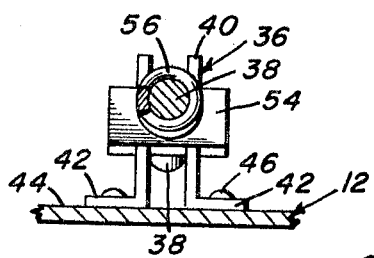
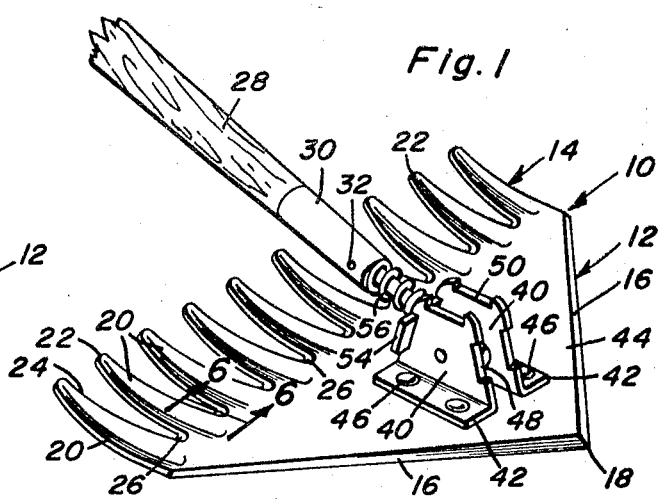
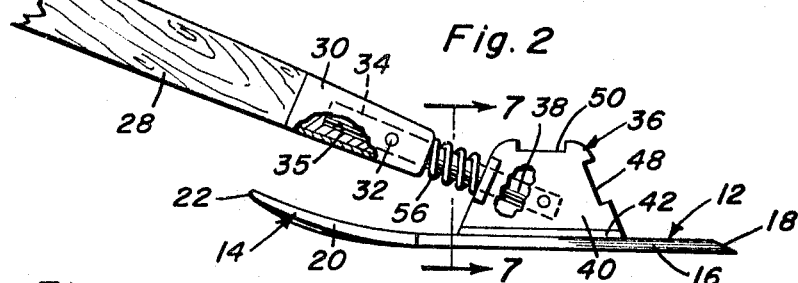
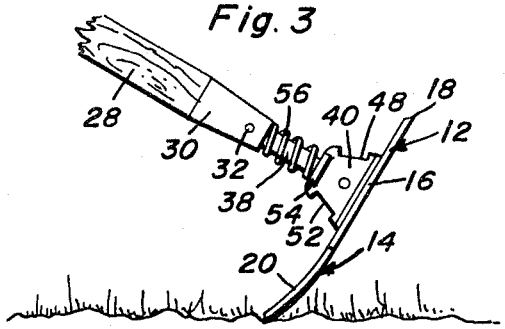
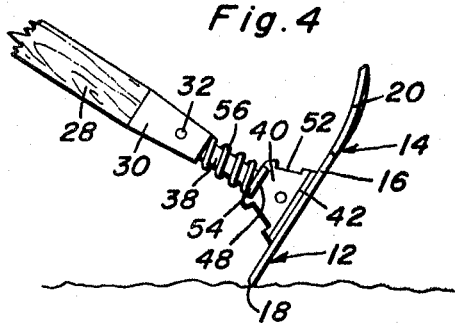
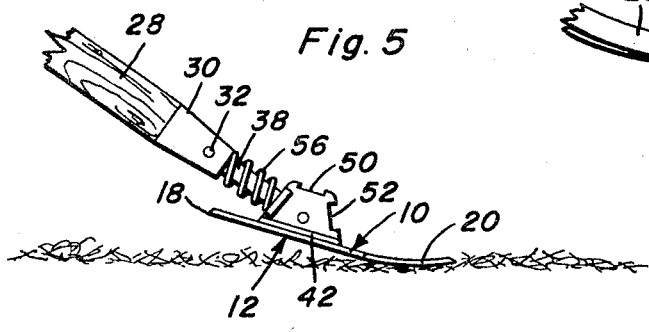
Michael Alosi
INVENTOR.

United States Patent Office 3,430,704
Patented Mar. 4, 1969

3,430,704
COMBINATION YARD AND GARDEN TOOL
Michael Alosi, 365 N. Pine St., Susanville, Calif. 96130
Filed Aug. 24, 1966, Ser. No. 574,729
U.S. Cl. 172—372
Int. Cl. A01b 1/06; A01d 7/00
3 Claims

ABSTRACT OF THE DISCLOSURE

A multipurpose hand-tool for garden and yard use, characterized by a blade having a V-shaped component for digging, furrowing, hoeing, cutting and weeding, and a companion toothed portion for scraping, diversified raking needs, soil penetration and aeration and scooping up weeds and debris, an elongated push-pull handle for stand-up use, and a pair of brackets fixed atop the blade. These brackets have marginal keeper seats for a spring-loaded cleat providing an adjusting and retaining latch capable of changing and holding the handle in selected angular positions.

---

This invention relates to certain new and useful improvements in a combination yard and garden tool characterized, generally speaking, by a simple and practical one piece multipurpose head or blade, a complemental amply long push-pull handle for comfortable stand-up use, and novel means operatively and adjustably uniting and joining the lower or leading end of the handle to the body portion of the blade.

Briefly, the head, more particularly the blade, comprises a suitable plate which is preferably, but not necessarily, 13 gauge carbon steel. This blade embodies a generally flat body portion which is V-shaped or triangulate in plan and whose forwardly converging coplanar marginal edges are sharpened and provide a pointed apical end. The end opposite the trailing end of the body portion is serrated and the serrations are shaped and arranged to provide a row of multipurpose teeth. The lower or leading end of the handle is sheathed in a rigidifying ferrule and is equipped with an axial shank, and novel means is provided to adjustably anchor the shank on a prescribed area of the blade.

As will be hereinafter more fully appreciated, the overall tool is such in construction and so implemented that it is versatile, is easy to adjust, handle and use, and is capable of effectually performing the work of four separate tools. It is designed and adapted to save time and labor, is virtually foolproof, is economical and such that it well serves the purposes for which it has been devised. The V-shaped body portion can be and has been aptly and effectively used for digging, furrowing and hoeing, and as a cutter-type weeder. Also, the toothed edge functions for scraping, raking, soil aeration and gathering and picking up weeds and so on.

Experimental use of the tool herein illustrated and described has repeatedly shown that it enables a user thereof to successfully cut and conveniently dispose of weeds. Likewise, the pointed V-shaped body portion is aptly usable for digging, furrowing, hoeing and for similar jobs. Further, the arcuately bowed teeth are so interrelated and positioned that they have the capability of efficient use for earth raking and scraping, soil penetrating and aerating needs, and picking up and handling weeds and debris. The lower or leading end of the long and accessible handle is joined by novel bracket means atop the body portion of the plate and in such a manner that it can be angled and then readily latched and held in whatever angular position the user finds best for effectually handling the task at hand. Then, too, the balanced marginal cutting edges and apical point and sharpened crotch portions between the basal ends of the rake teeth contribute their proportionate share of uniqueness and utility to the over-all blade.

In evaluating and comparing the present invention with prior combination hoes and rakes, Bailey's Patent 538,146, for example, it should be noted that the user is not called upon to remove the handle to make angular adjustments. In fact, the herein disclosed handle is novel in that it is provided with a ferrule-equipped shank whose leading end is hinged between a pair of novel brackets. These brackets, in turn, are marginally provided with keeper notches or seats which are arranged in a novel manner and relationship and accordingly function to receive and retain a spring-loaded cleat or latch which is slidingly mounted on the shank and is finger controlled for best results.

Persons conversant with the art to which the invention relates are aware that in addition to the above-mentioned Bailey patent many and other prior patents could be cited as germane to the invention herein under advisement. For instance as having a general bearing on the case the combination tool in the long expired Lines Patent 236,711 may be regarded as indicative art but is being touched upon herein to bring out the fact that it has always been a problem as to how best to operatively join the lower or leading end of the handle with the head or combination blade and rake. It is therefore another objective to provide the median body portion with a pair of duplicate brackets whose main vertical portions are disposed in spaced apart parallel relation and whose lower ends are provided with outstanding flanges which are superimposed upon and rigidly secured atop the body portion. With this adaptation and arrangement the marginal edges of the brackets are provided with individual circumferentially spaced marginal notches which serve as keeper seats. A simple cleat is centrally apertured and slidingly mounted on the shank provided therefor and this cleat is such that it bridges the space between the two brackets and provides a keeper or latch. The end portions thereof can be selectively and removably seated in the intended keeper seats. Then, too, a coil spring encircles the shank and has one end bearing against an end portion of the handle and the other end portion bearing against the centrally apertured portion of the cleat. It follows that with this construction and arrangement the accessible projecting end portions of the latching cleat can be caught hold of with the fingers in a manner to compress the spring and to facilitate pivoting, adjusting and retaining the bracketed handle to promote handling of the blade or head in whatever manner desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective with the left hand end portion of the handle broken away and which shows a combination yard and garden tool constructed in accordance with the invention and also shows one manner of using the same.

FIG. 2 is a view in edge elevation of the construction and arrangement shown in FIG. 1 and with a portion of one of the brackets broken away to show the pivoted end portion of the shank.

FIG. 3 is a view on a smaller scale showing a centralized handle position with the handle latched in place and also showing the blade or head in a position broadly referred to as a rake.

FIG. 4 is also a view similar to FIG. 3 and wherein the handle position is the same but with the tool turned upside down and illustrating the V-shaped portion readied for use for digging or as a scuffle hoe.

FIG. 5 is another view on the same scale appearing in FIGS. 3 and 4 and showing a further adjustment and wherein the so-called pitchforking position is illustrated.

FIG. 6 is a fragmentary view on an enlarged scale taken on the plane of the section line 6—6 of FIG. 1 and showing the sharpened edge portion of a crotch between the rake fingers or teeth.

And FIG. 7 is an enlarged detail view taken on the plane of the vertical section line 7—7 of FIG. 2.

Referring now to FIGS. 1, 2 and 7, it will be noted that the tool head, more specifically referred to as a one-piece blade, is denoted by the numeral 10 and is characterized by a substantially V-shaped or triangulate body portion 12 (at the right in FIGS. 1 and 2), and a toothed rake portion 14 at the rear or left. The body portion is substantially flat and has beveled suitably sharpened marginal cutting edges 16 which converge toward and join with the apical or penetrating point 18. The serrated left hand end portion 14 provides the aforementioned rake and is characterized by a plurality of relatively long longitudinally curved correspondingly constructed teeth or fingers 20. The terminal free ends are rounded and blunt as at 22. Adequate V-shaped spaces are provided at 24 between the respective teeth. Each crotch portion is arcuately rounded and suitably sharpened to provide an additional cutting edge as at 26. The handle, which is suitably long for stand-up use, is denoted by the numeral 28 and the forward or leading end portion is appropriately tapered and reinforced by a rigidifying ferrule 30 riveted or otherwise secured in place at 32. An end portion of the axial forwardly and downwardly projecting shank, that is the portion 34 (dotted lines FIG. 2) is telescopingly fitted in a socket 35 provided therefor. The shank proper is fitted in an existing space between a pair of substantially L-shaped brackets 36. The shank is denoted at 38. Each bracket comprises a vertical plate portion 40 and an outstanding flange 42 which is superimposed on the top surface 44 and is riveted or otherwise secured in place as at 46. It will be further noted that the accessible marginal edge portions of the plate of each bracket have keeper notches formed therein. These notches may be said to be circumferentially spaced apart at approximately equidistant points as shown in FIG. 2. One notch is denoted and differentiated at 48, a second notch at 50 and a third notch at 52. Actually all of the notches are the same in construction but have been referred to here individually because of their relationship to the main component body portion 12 and rake portion 14 respectively. The respective keeper notches 48, 50 and 52 are properly lined up and paired as clearly shown in FIG. 1 to accommodate and releasably seat and retain coacting end portions of a cleat 54 which has a central apertured portion slidable on the shank and with its left and right (FIG. 7) end portions releasably engageable in the selected keeper notches or seats. To obtain the results desired the cleat or keeper not only bridges the space between the plate portions 40, it is spring-biased by way of a suitably tensioned coil spring 56. The coil spring encircles the shank 38 and has one end bearing against the forward end of the handle and the other end bearing against the intermediate apertured portion of the cleat.

By referring to the views of the drawing, singly and collectively, it will be evident that the handle means 28 can be positioned as shown for example in FIGS. 1 and 2 and securely latched in place and can also be latched in place with the handle at approximate right angles to the body portion 12 as shown in FIGS. 3 and 4 and can be reversed and latched in place as shown in FIG. 5. FIGS. 1 and 2, for example, show the position and relationship of the component parts when the tool is used, generally speaking, for weed cutting. With reference to FIG. 3 the handle is shown latched in the position wherein the head or blade is employed, also generally speaking, as a raking or scraping implement. In FIG. 4 with the teeth 20 up and the pointed end 18 down, the tool is shown in a position for hoeing, digging and furrowing. In FIG. 5 the tool is arranged with the rake teeth in front at the right and the hoe at the left and which may be referred to, also generally speaking, as a pitchforking position. It will be evident therefore that the tool herein shown and described constitutes an adaptation which is versatile, unusual, and effectively designed and adapted to carry out the aims and purposes described. Accordingly, a more detailed description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose hand-tool for home, garden and yard use comprising, in combination, a one-piece blade having a flat body portion V-shaped in plan for digging, furrowing and hoeing, and weeding, and an auxiliary complemental marginal edge portion embodying a row of teeth designed and adapted for scraping, raking earth, soil penetration and aeration and scooping and picking up weeds and debris, a vertically elongated push-pull handle for stand-up use, said handle having a lower leading end provided with a forwardly axially projecting shank, said shank comprising a rigid shaft having a rearward end portion fitting telescopingly and retentively into a coacting end portion of said handle, said coacting portion being reinforced by a complemental rigidifying ferrule, and means for adjustably mounting and joining said leading end of said shank to a median area of the V-shaped body portion of said blade, said mounting and joining means comprising a pair of separate and independent duplicate flat-faced truncated triangulate brackets disposed in spaced apart parallel relationship and having lateral bottom flanges superimposed upon and rigidly secured atop a prescribed median area of said body portion, said shank being rigid and having its forward end portion projecting into the space between and pivotally joined to median portions of the respective brackets, said bracket having straight marginal edges provided with individual circumferentially spaced marginal notches defining keeper seats, a flat faced rectangular cleat having a centrally apertured portion rotatably and slidingly mounted on the forward end portion of said shank, said cleat bridging the space between said brackets and constituting a keeper and having end portions compatibly conformable and selectively and removably seatable in selected ones of said keeper seats and free terminal portions projecting beyond the respective brackets and providing accessible fingergrips, and a coil spring encircling said shank and having one end bearing against an end portion of the handle and the other end bearing against the centrally apertured portion of said cleat.

2. The tool and structure defined in claim 1 and wherein said V-shaped portion has its marginal edges sharpened and providing cutting edges, said cutting edges converging toward a leading centralized ground-penetrating point, said point being in line with the space between said brackets, said teeth being longitudinally curved and having blunt free end portions, wherein the portions intervening between the respective teeth constitute individual crotch portions, and each crotch portion being arcuately shaped and having marginal edges which are sharpened.

3. A multipurpose hand-tool for home, garden and yard use comprising, in combination, a one-piece blade having a body portion V-shaped in plan and an auxiliary complemental portion embodying a row of teeth, said teeth being longitudinally curved, reinforced and having rounded terminal free end portions, portions intervening between the respective corresponding ends of said teeth constituting crotch portions and each crotch portion being arcuately shaped and having sharpened marginal edges, the marginal edges of said V-shaped body portion being sharpened and providing cutting edges, said cutting edges converging toward a leading centralized ground-penetratin point, a flat-faced pair of plate-like triangulate brackets disposed in spaced apart parallel relation and having portions secured atop a median area of said body portion, said plates having distinct substantially marginal edge portions provided with individual spaced marginal notches defining keeper seats, the keeper seats of one plate being paired and aligned with companion keeper seats on the other plate, a rigid flat faced rectangular cleat bridging the space between said plates and having end portions selectively and removably seatable in chosen ones of said seats and having terminal end portions projecting significant distances beyond the respective plates and providing accessible finger-grips, said cleat being provided with a central opening aligned with the space between said plates, a vertically elongated push-pull handle, said handle having a lower leading end provided with a forward axially projecting shank passing through the aperture in said cleat and into the space between said plates and hingedly joined with median portions of the respective plates, and a coil spring encircling said shank and having one end bearing against an end portion of the handle and the other end bearing against the centrally apertured portion of said cleat.

References Cited

UNITED STATES PATENTS

| | | | |
|---|---|---|---|
| 135,462 | 2/1873 | Barnes | 172—375 |
| 538,146 | 4/1895 | Bailey | 172—372 |
| 1,784,108 | 12/1930 | Pearson | 306—13 |
| 1,810,026 | 6/1931 | Moller. | |

ABRAHAM G. STONE, *Primary Examiner.*

JAMES W. PETERSON, *Assistant Examiner.*

U.S. Cl. X.R.

172—375